United States Patent
Kono (10) Patent No.: US 12,036,746 B2
(45) Date of Patent: Jul. 16, 2024

(54) JOINED STRUCTURE AND METHOD OF MANUFACTURING THE SAME

(71) Applicant: Nissan Motor Co., Ltd., Kanagawa (JP)

(72) Inventor: Kentaro Kono, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/253,813

(22) PCT Filed: Jun. 18, 2018

(86) PCT No.: PCT/IB2018/000769
§ 371 (c)(1),
(2) Date: Dec. 18, 2020

(87) PCT Pub. No.: WO2019/243855
PCT Pub. Date: Dec. 26, 2019

(65) Prior Publication Data
US 2021/0362439 A1 Nov. 25, 2021

(51) Int. Cl.
*B29C 65/48* (2006.01)
*B29L 31/30* (2006.01)
*B32B 3/26* (2006.01)

(52) U.S. Cl.
CPC .......... *B29C 65/4835* (2013.01); *B32B 3/263* (2013.01); *B29L 2031/3002* (2013.01)

(58) Field of Classification Search
CPC .. B32B 3/263; B32B 1/00; B32B 3/26; B32B 7/12; B29L 2031/3002
See application file for complete search history.

(56) References Cited

U.S. PATENT DOCUMENTS

| 7,521,110 | B2 | 4/2009 | Travis et al. |
| 7,700,179 | B2 | 4/2010 | Travis et al. |
| 7,794,818 | B2 | 9/2010 | Travis et al. |
| 2004/0166288 | A1 | 8/2004 | Travis et al. |
| 2007/0269639 | A1* | 11/2007 | Travis ............. B29C 48/08 428/156 |
| 2008/0075923 | A1 | 3/2008 | Travis et al. |

(Continued)

FOREIGN PATENT DOCUMENTS

| CN | 1537247 A | 10/2004 |
| ES | 8900070 A1 | 11/1988 |

(Continued)

OTHER PUBLICATIONS

Espacenet translation of JP2012144213 (Year: 2022).*

(Continued)

*Primary Examiner* — Michael Zhang
(74) *Attorney, Agent, or Firm* — Osha Bergman Watanabe & Burton LLP (57) ABSTRACT

A joined structure, including: two members made of materials having different coefficients of linear expansion; and an adhesive layer arranged between the two members to join the two members together, wherein the adhesive layer includes at least an end portion in one direction parallel to a plane direction of the adhesive layer and a center portion in the one direction, and a thickness in the end portion is greater than a thickness in the center portion.

8 Claims, 6 Drawing Sheets

(56) References Cited

U.S. PATENT DOCUMENTS

| | | | | |
|---|---|---|---|---|
| 2014/0159425 A1* | 6/2014 | Kim | ................. | B29C 45/14344 |
| | | | | 29/897.2 |
| 2015/0344075 A1* | 12/2015 | Seo | ....................... | B62D 27/02 |
| | | | | 296/210 |
| 2016/0257094 A1* | 9/2016 | Lestringant | ............... | B60J 1/02 |
| 2018/0022395 A1 | 1/2018 | Hamada et al. | | |

FOREIGN PATENT DOCUMENTS

| | | | | | |
|---|---|---|---|---|---|
| ES | 8900070 A | * | 1/1989 | | |
| JP | 2005-271783 A | | 10/2005 | | |
| JP | 2011-177453 A | | 9/2011 | | |
| JP | 2011177453 A | * | 9/2011 | | |
| JP | 2012-144213 A | | 8/2012 | | |
| JP | 2017-61068 A | | 3/2017 | | |
| JP | 2017-185911 A | | 10/2017 | | |
| WO | 2013/021452 A1 | | 2/2013 | | |
| WO | WO-2013021452 A1 | * | 2/2013 | ............. | B62D 25/06 |
| WO | 2016/132425 A1 | | 8/2016 | | |

OTHER PUBLICATIONS

Espacenet Translation of WO-2013021452-A1 (Year: 2022).*
Espacenet Translation of JP-2011177453-A (Year: 2023).*
AAO—Learn the Nine Essentials Parts of Eyeglasses, https://www.aao.org/eye-health/glasses-contacts/learn-nine-essential-parts-of-eyeglasses, Nov. 29, 2017 (Year: 2017).*

* cited by examiner

JOINED STRUCTURE AND METHOD OF MANUFACTURING THE SAME

TECHNICAL FIELD

The present invention relates to a joined structure in which two members which are made of materials having coefficients of linear expansion different from each other (hereinafter, also referred to as "different material members") are joined together with an adhesive layer arranged therebetween, and a method of manufacturing the joined structure.

BACKGROUND ART

Japanese Patent Application Publication No. 2017-185911 discloses a technique related to the above-described joined structure.

SUMMARY OF INVENTION

Technical Problem

Incidentally, in a joined structure in which different material members are joined together with an adhesive layer arranged therebetween, when the temperature of the surrounding environment is changed for example, a difference between amounts of thermal expansion or amounts of thermal contraction of the different material members causes a strain in the adhesive layer. In terms of securing the adherability demanded of the joined structure, the adhesive layer is required to be formed thin; however, there is a problem that the thinner the adhesive layer is formed, the more the above-described strain is increased and the more likely a crack is to be generated.

An object of the present invention is to improve the adherability of a joined structure in which different material members are joined together with an adhesive layer arranged therebetween, while suppressing generation of a crack in the adhesive layer.

Solution to Problem

An aspect of the present invention is a joined structure in which an adhesive layer includes at least an end portion in one direction parallel to a plane direction of the adhesive layer and a center portion in the one direction, and a thickness in the end portion is greater than a thickness in the center portion.

Advantageous Effects of Invention

According to the above-described joined structure, it is possible to improve the adherability while suppressing generation of a crack in the adhesive layer.

DESCRIPTION OF EMBODIMENTS

Hereinafter, joined structures according to some embodiments are described with reference to the drawings.

First Embodiment

Figure 1:
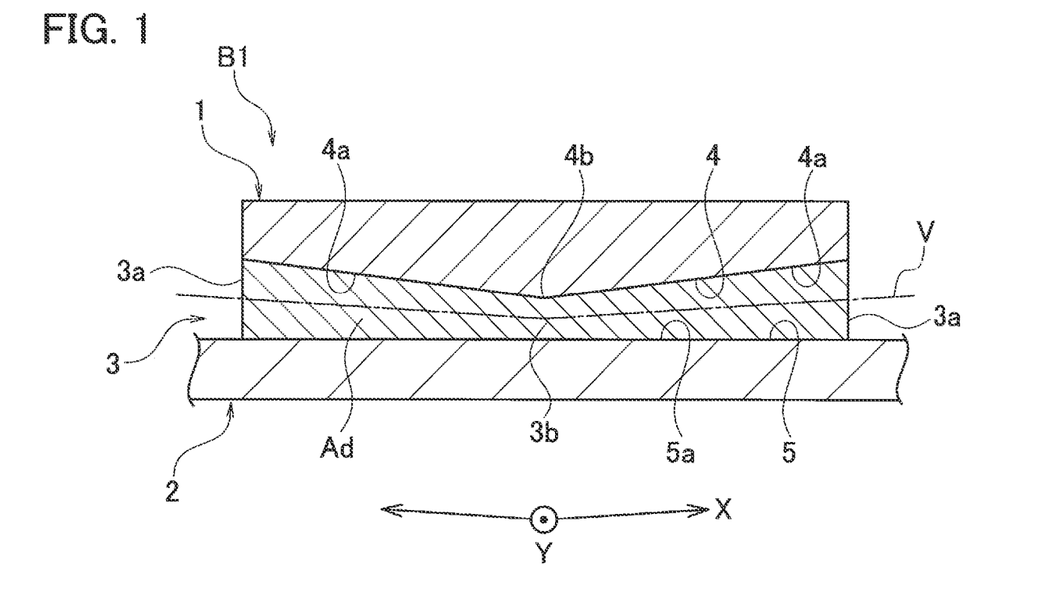
FIG. 1 is a cross-sectional view of a joined structure according to a first embodiment.

As illustrated in FIG. 1, a joined structure B1 according to a first embodiment includes a first member 1 (hereinafter, member 1), a second member 2 (hereinafter, member 2), and an adhesive layer 3 arranged between the member 1 and the member 2 to join the members 1 and 2 together. The member 1 and the member 2 are formed of materials having coefficients of linear expansion different from each other.

The member 1 is a member in the form of a plate made of carbon fiber reinforced plastic. The carbon fibers as reinforcement fibers are made of continuous fibers and, for example, may have a lamination configuration in which the reinforcement fibers facing in one direction are laminated at different angles, or the form of a cloth. Fibers such as polyacrylonitrile (PAN-based), pitch-based, cellulose-based, vapor deposition-based carbon fibers using carbon hydride, or graphite fibers may be used as the carbon fibers, for example. Two or more types of these fibers may be combined with each other for use. The carbon fibers may include short fibers. A publicly known thermoset resin or thermoplastic resin may be used as a matrix resin. Specifically, for example, a resin such as an epoxy resin, a phenol resin, an unsaturated polyester resin, a vinyl ester resin, a polyimide resin, a polycarbonate resin, a polyamide resin, or a polyphenylene sulfide (PPS) resin may be used.

The member 2 is a member in the form of a plate made of a steel plate. Note that, the materials of the members 1 and 2 are not limited to the combination of this embodiment as long as the materials have coefficients of linear expansion different from each other, and a combination other than that of this embodiment of two materials selected from materials such as various metallic materials, fiber reinforced plastic, and other compound materials may be applied. Candidates for the metallic materials may be, for example, iron steel, copper, an aluminum alloy, and so on. Candidates for the fiber reinforced plastic may be, for example, one formed of reinforcement fibers such as carbon fibers, glass fibers, polyaramid fibers, alumina fibers, silicon carbide fibers, boron fibers, and silicon carbide fibers and the above-described matrix resin.

The shape of each of the members 1 and 2 is not limited to the form of a plate and may be the form of a stick, a tube, a column, a cone, or a block, a curved or bent shape, a complicated shape including two or more of the above, or the like.

The member 1 includes a first attaching surface 4 (hereinafter, attaching surface 4). The member 2 includes a second attaching surface 5 (hereinafter, attaching surface 5). The attaching surface 5 is arranged to face the attaching surface 4 with the adhesive layer 3 arranged therebetween. The attaching surface 4 is a region of a surface of the member 1 that is directly put in contact with the adhesive layer 3, while the attaching surface 5 is a region of a surface of the member 2 that is directly put in contact with the adhesive layer 3.

The adhesive layer 3 is a layer formed of an adhesive Ad. The adhesive Ad is not particularly limited, and a publicly known adhesive such as an acryl-based, an epoxy-based, a urethane-based, a silicone-based, or a modified silicone-based may be used, for example. The adhesive Ad may be either of a normal temperature curing type and a heat curing type and may be either of a single component type and a two component type.

The adhesive layer 3 includes a plane direction XY (hereinafter, also referred to as XY direction) in a direction substantially parallel to the attaching surface 4 and the attaching surface 5 that is, specifically, a direction along a virtual plane V that is equidistant from the two attaching surfaces 4 and 5. A thickness direction Z (hereinafter, Z direction) of the adhesive layer 3 is a direction orthogonal to the virtual plane V. The adhesive layer 3 includes a longitudinal direction X (hereinafter, X direction) in one direction parallel to the plane direction XY. The one direction parallel to the plane direction XY is a direction parallel to an axis of coordinate of orthogonal coordinates on the virtual plane V. The adhesive layer 3 includes a transverse direction Y (hereinafter, Y direction) in a direction orthogonal to the X direction.

In the adhesive layer 3, a surface on one side in the Z direction (upper side in FIG. 1) is put in contact with the attaching surface 4, and a surface on the other side in the Z direction (lower side in FIG. 1) is put in contact with the attaching surface 5. Additionally, the adhesive layer 3 includes a pair of end portions 3a positioned on two outer sides in the X direction and a center portion 3b positioned between the end portions 3a. In this embodiment, the center portion 3b is positioned in a position in which a length in the X direction of the adhesive layer 3 is divided in half.

A thickness of the adhesive layer 3 is the smallest in the center portion 3b, is increased toward the outer sides in the X direction from the center portion 3b, and is the greatest in the pair of the end portions 3a. That is, a Z direction dimension of a clearance between the attaching surface 4 and the attaching surface 5 is the smallest in a position in which the attaching surface 4 and the attaching surface 5 are put in contact with the center portion 3b, is increased toward the outer sides in the X direction from the position of the center portion 3b, and is the greatest in a position in which the attaching surface 4 and the attaching surface 5 are put in contact with the end portions 3a.

The attaching surface 5 may be formed of a single flat surface 5a as illustrated in FIG. 1. The attaching surface 4 may be formed of two flat inclined surfaces 4a. In this case, each inclined surface 4a is arranged to be inclined with respect to the attaching surface 5, with the inclined surface 4a being farther from the attaching surface 5 as being closer to the outer side in the X direction. An intersection line 4b of the two inclined surfaces 4a is put in contact with the center portion 3b of the adhesive layer 3. The shape of each of the attaching surfaces 4 and 5 can be formed by press molding, a mechanic molding, or the like.

Hereinafter, operations and effects of this embodiment are described.

[1] In the joined structure in which the different material members are joined together with the adhesive layer arranged therebetween, when the temperature of the joined structure is changed because of a change in the temperature of the surrounding environment, for example, a shear strain due to a difference of the coefficients of linear expansion between the different material members is generated in the adhesive layer. When the thickness of the adhesive layer is constant in the plane direction, the shear strain is likely to be great in the end portions on the outer sides in the plane direction of the adhesive layer, and if the shear strain exceeds a rupture strain of the adhesive, a crack may be generated in the adhesive layer. On the other hand, if the thickness of the adhesive layer is uniformly increased to reduce the shear strain in order to avoid the crack, the adherability of the joined structure may be degraded.

According to the joined structure B1 of this embodiment, the thickness in the end portions 3a of the adhesive layer 3 is greater than the thickness in the center portion 3b thereof. Consequently, it is possible to improve the adherability with the small thickness in the center portion 3b while suppressing generation of a crack in the adhesive layer 3 by reducing the shear strain in the end portions 3a.

[2] Additionally, the shear strain in the adhesive layer 3 has a tendency to be distributed so as to be increased toward the outer sides in the X direction from the center portion 3b. According to the joined structure B1, since the thickness of the adhesive layer 3 is increased toward the outer sides in the X direction from the center portion 3b like the distribution tendency of the shear strain, it is possible to distribute the shear strain of the adhesive layer 3 more evenly in the X direction. Consequently, it is possible to alleviate a local concentration of the shear strain and to suppress the generation of a crack in the adhesive layer 3 more reliably. Specifically, in this embodiment, since the thickness of the adhesive layer 3 is increased at a constant incline (linearly in a cross section) toward the outer sides in the X direction from the center portion 3b, the shear strain is distributed more evenly.

[3] Moreover, the shear strain of the adhesive layer 3 has a tendency to be the greatest in the end portions 3a in the X direction (longitudinal direction) among end portions on outer sides in the XY direction. According to the joined structure B1, since the thickness of the end portions 3a positioned on the two outer sides in the X direction is greater than the thickness of the center portion 3b, it is possible to reduce the maximum value of the shear strain more reliably and to suppress the generation of a crack in the adhesive layer 3 more reliably.

Figure 2:
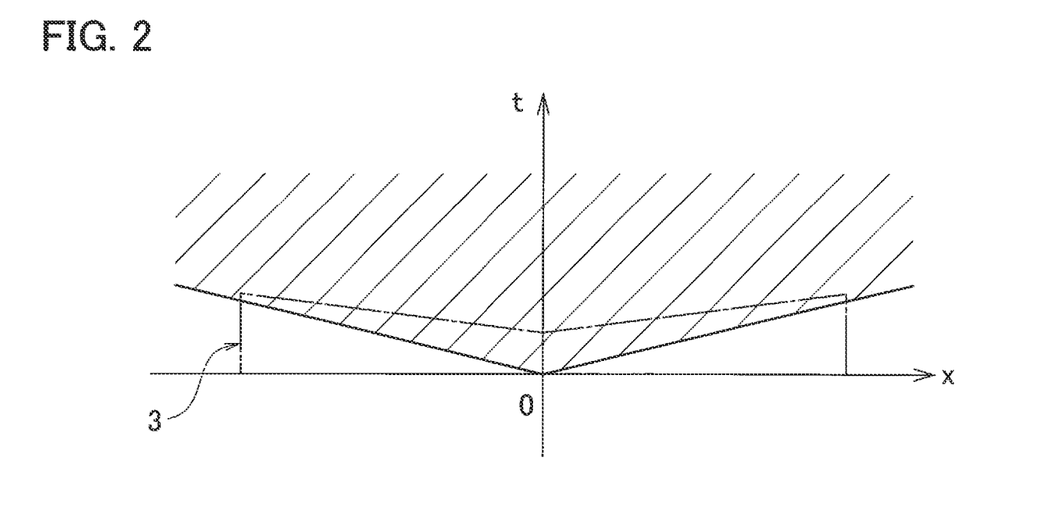
FIG. 2 is a graph indicating a favorable range of a lower limit value of a thickness of an adhesive layer.

[4] It is favorable to set a lower limit value of the thickness of the adhesive layer 3 to be within a range expressed by the following expression (1) (shaded area in FIG. 2). Consequently, the shear strain generated in the adhesive Ad of the adhesive layer 3 can be kept less than a shear rupture strain m, and this makes it possible to reduce the generation of a crack in the adhesive layer 3 more reliably:

[Math. 1]

$$t(x) > \frac{|\alpha_2 - \alpha_1| \cdot |\Delta T|}{2 \cdot \varepsilon_B} \cdot |x|, \quad (1)$$

where x: a position in the X direction with the center portion 3b set as an origin, t: a thickness of the adhesive layer 3, $\alpha_1$: a coefficient of linear expansion of the material of the member 1, $\alpha_2$: a coefficient of linear expansion of the material of the member 2, $\Delta T$: an amount of change in temperature of the joined structure B1 (members 1 and 2), and $\varepsilon_B$: a tensile rupture strain of the adhesive Ad, and $\varepsilon_B$ and the shear rupture strain $\tau B$ of the adhesive Ad satisfy $\tau_B = 2 \cdot \varepsilon_B$.

[5] Additionally, since the joined structure B1 can exert the excellent adherability and the effect of preventing a crack in the adhesive layer 3 against a change in temperature in the surrounding environment, the joined structure B1 is favorable as a member used in a step involving a relatively great change in temperature such as a baking step of electrodeposition coating. According to the joined structure B1 on which the electrodeposition coating has been performed, it is possible to obtain a product in which the generation of a crack due to a thermal expansion or a thermal contraction in the baking step is suppressed and the corrosion resistance and the strength reliability are improved.

<Method of Manufacturing Joined Structure>

Figure 3:
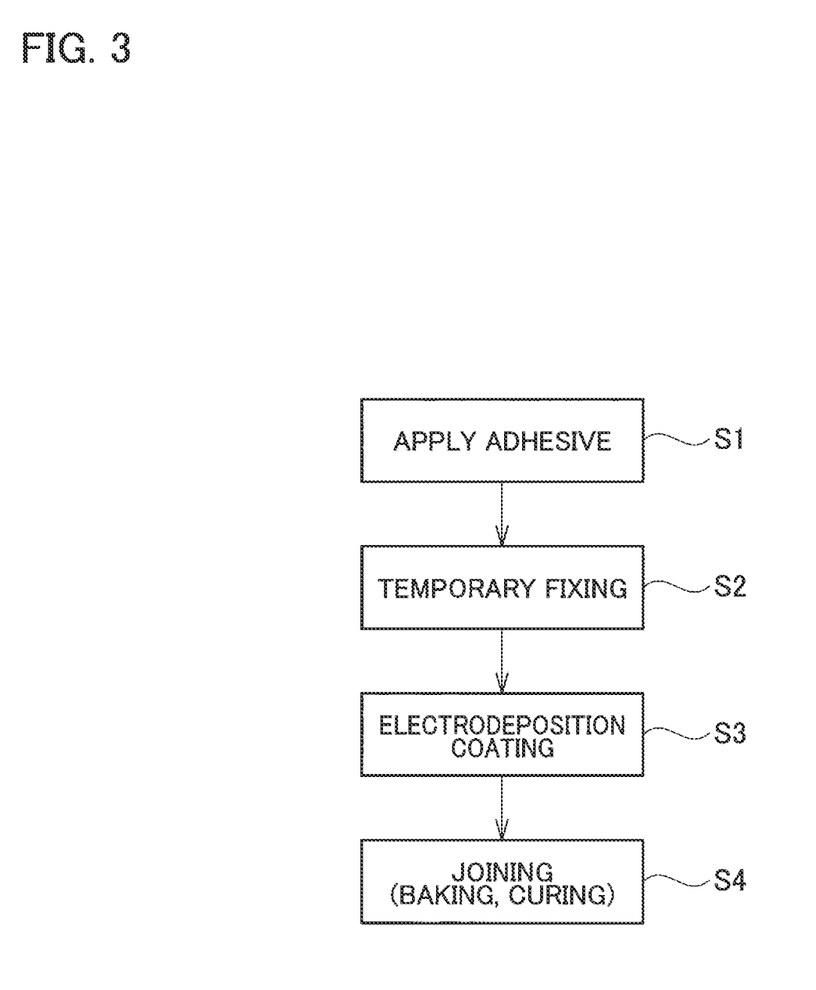
FIG. 3 is a flowchart indicating a method of manufacturing the joined structure.

Hereinafter, a method of manufacturing the joined structure B1 on which the electrodeposition coating has been performed is described with reference to FIG. 3.

This method includes an adhesive applying step S1, a temporary fixing step S2, an electrodeposition coating step S3, and a joining step S4. This method may include a step such as an intermediate coating step and an over coating step after the joining step S4 and may include a step such as a step of degreasing and cleaning the attaching surfaces 4 and 5 before the adhesive applying step S1.

In the adhesive applying step S1, the adhesive Ad is applied to either one of or both the attaching surfaces 4 and 5. The adhesive Ad used in this method is a heat curing type-adhesive in which curing is accelerated by heat. The curing temperature is equal to the baking temperature of a coating film formed by the electrodeposition coating.

In the temporary fixing step S2, the member 1 and the member 2 to which the adhesive is already applied are put together with the uncured adhesive layer 3 arranged therebetween, and is temporarily fixed by a temporary fixing jig. The temporary fixing is performed with the member 1 and the member 2 positioned such that the Z direction dimension of the clearance between the attaching surface 4 and the attaching surface 5 is the smallest in the position in which both the attaching surfaces 4 and 5 are put in contact with the center portion 3b and is the greatest in the position in which both the attaching surfaces 4 and 5 are put in contact with the end portions 3a.

In the electrodeposition coating step S3, the electrodeposition coating is performed on the temporarily fixed members 1 and 2. Specifically, an electrodeposition liquid in which electrodeposition paint is dissolved or distributed in water is reserved in an electrodeposition tank, and the temporarily fixed members 1 and 2 are immersed in this electrodeposition liquid. Then, the coating film is formed by applying a direct voltage between the members 1 and 2 and an electrode in the layer to electrically deposit the electrodeposition paint existing as ions in the electrodeposition liquid on the surfaces of the members 1 and 2.

In the joining step S4, the member 1 and the member 2 are joined together by curing the adhesive layer 3 while heating the members 1 and 2 on which the electrodeposition coating has been performed by a heating device and baking the coating film formed by the electrodeposition coating on the members 1 and 2. Although the conditions for the heating are not particularly limited, the heating temperature is about 180° C., and the heating time is about 20 minutes. A thickness of the heated and cured adhesive layer 3 is greater in the end portions 3a on the two outer sides in the X direction than in the center portion 3b in the X direction of the adhesive layer 3. After the joining step S4, the joined structure B1 is cooled down to the normal temperature.

Hereinafter, the operations and effects of this method are described.

Figure 4A:
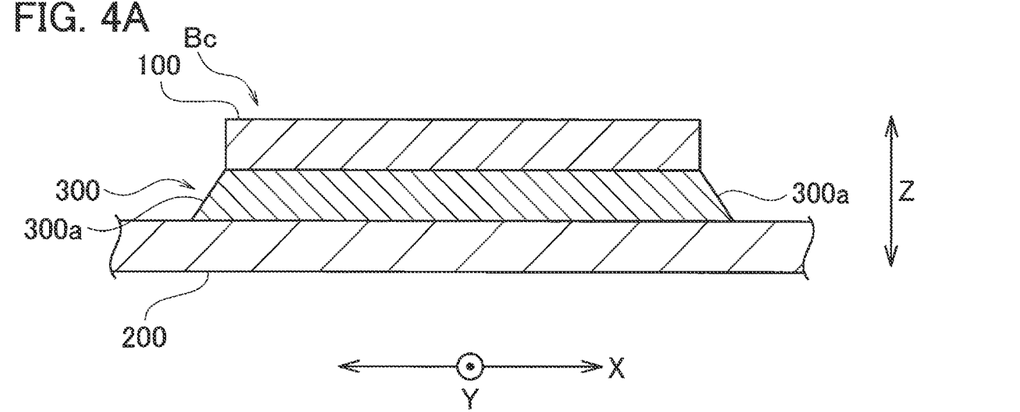
FIG. 4A is a diagram describing a mechanism of generation of a crack in an adhesive layer according to a comparative example.
Figure 4B:
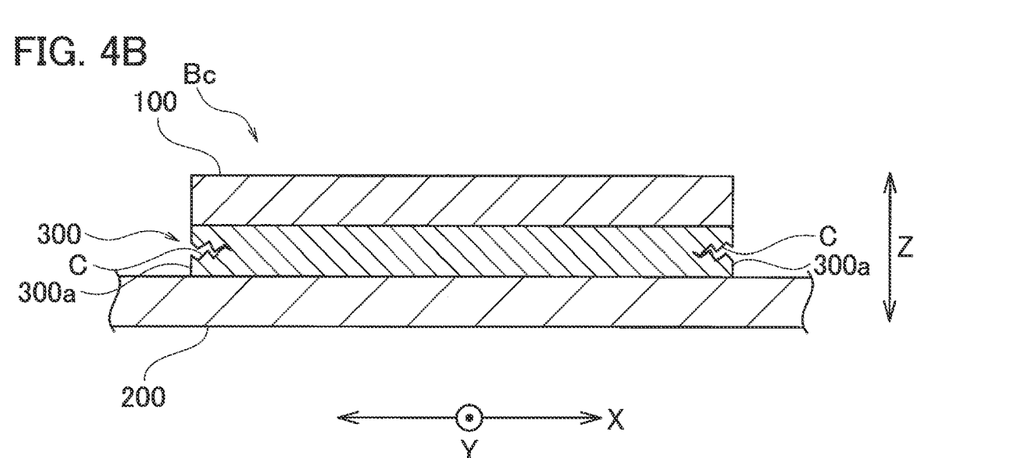
FIG. 4B is a diagram following FIG. 4A.

FIG. 4A and FIG. 4B are diagrams describing the mechanism of how a crack is generated in an adhesive layer 300 in a joined structure Bc according to a comparative example. In the joined structure Bc, a thickness of the adhesive layer 300 is constant in the X direction. FIG. 4A illustrates a shape of a cross section when the joined structure Bc is heated and the adhesive layer 300 is cured (early stage after starting the cooling where the curing is completed). FIG. 4B illustrates a shape of a cross section after the joined structure Bc is cooled down to the normal temperature from the state in FIG. 4A.

Due to a difference of amounts of thermal expansion between a member 100 and a member 200, the adhesive layer 300 is cured while being deformed in a trapezoid having an X direction length on the side of the member 200 longer than an X direction length on the side of the member 100. Thereafter, once the joined structure Bc is cooled down to the normal temperature, due to a difference of amounts of thermal contraction between the member 100 and the member 200, the joined structure Bc is deformed into a rectangular having the X direction length on the side of the member 200 and the X direction length on the side of the member 100 substantially equal to each other. This deformation generates a shear strain in the adhesive layer 300. The shear strain is likely to be increased in end portions 300a on outer sides in the X direction of the adhesive layer 300, and when the shear strain exceeds the shear rupture strain of the adhesive Ad, a crack C may be generated in the adhesive layer 300 as illustrated in FIG. 4B.

[6] According to this method, the thickness of the adhesive layer 3 cured by the heating is set to be greater in the end portions 3a than in the center portion 3b. Consequently, it is possible to improve the adherability with the small thickness in the center portion 3b while suppressing the generation of a crack in the adhesive layer 3 by reducing the shear strain in the end portions 3a generated in the cooling step after the curing.

[7] Additionally, according to this method, since the heat curing type-adhesive Ad of which the curing temperature is equal to the baking temperature of the coating film is used, the baking of the coating film and the curing of the adhesive Ad can be simultaneously performed by curing once. Consequently, it is possible to manufacture the joined structure B1 on which the electrodeposition coating has been performed with good productivity.

Other Embodiments

Next, joined structures B2 to B6 according to second to sixth embodiments are described with reference to FIGS. 5 to 9. Note that, configurations of the following embodiments different from that of each of the preceding embodiments are only described, and a description of a configuration similar to the configuration already described is omitted while using a similar reference sign.

Second Embodiment

Figure 5:
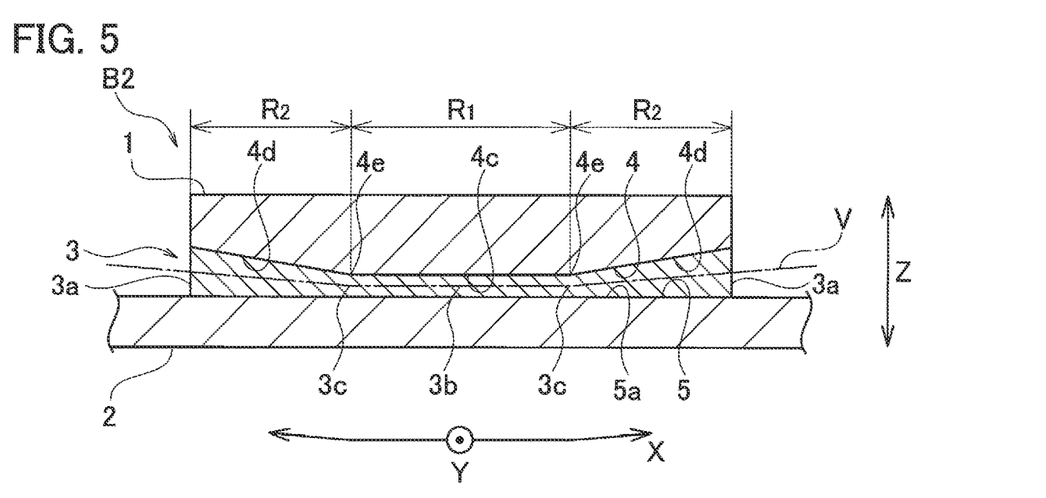
FIG. 5 is a cross-sectional view of a joined structure according to a second embodiment.

In the second embodiment, the adhesive layer 3 includes a center region $R_1$ and a pair of outer edge regions $R_2$ as illustrated in FIG. 5. The center region $R_1$ includes the center portion 3b. The pair of outer edge regions $R_2$ extend outward in the X direction from boundary portions 3c on two outer sides in the X direction of the center region $R_1$ and include the end portions 3a, respectively.

A thickness in the center region $R_1$ of the adhesive layer 3 is constant in the X direction. A thickness in each outer edge region $R_2$ is the smallest in the boundary portion 3c between the center region $R_1$ and the outer edge region $R_2$, is increased toward the outer side in the X direction from the boundary portion 3c, and is the greatest in the end portion 3a. That is, the Z direction dimension of the clearance between the attaching surface 4 and the attaching surface 5 is constant within an area in which the attaching surfaces 4 and 5 are put in contact with the center region $R_1$. The Z direction dimension of the clearance is the smallest in the position in which the attaching surfaces 4 and 5 are put in contact with the boundary portion 3c, is increased toward the outer sides in the X direction from the position of the boundary portion 3c, and is the greatest in the position in which the attaching surfaces 4 and 5 are put in contact with the end portions 3a.

The attaching surface 5 may be formed of the single flat surface 5a as illustrated in FIG. 5. The attaching surface 4 may be formed of one flat surface 4c parallel to the attaching surface 5 and two flat inclined surfaces 4d. In this case, each inclined surface 4d is arranged to be inclined with respect to the attaching surface 5, with the inclined surface 4d being farther from the attaching surface 5 as being closer to the outer side in the X direction. The flat surface 4c is put in contact with the center region $R_1$ of the adhesive layer 3, and the two inclined surfaces 4d are respectively put in contact with the outer edge regions $R_2$. An intersection line 4e of each inclined surface 4d and the flat surface 4c is put in contact with the boundary portion 3c of the adhesive layer 3.

According to the joined structure B2 of this embodiment, since the thickness of the adhesive layer 3 in the center region $R_1$ is constant in the X direction, it is possible to secure an optimum thickness of the adhesive layer 3 in a wider area of the center region $R_1$ and to improve the adherability.

Additionally, according to this embodiment, since the thickness of the adhesive layer 3 is increased toward the outer sides in the X direction from the boundary portion 3c, it is possible to distribute the shear strain in the outer edge regions $R_2$ more evenly in the X direction. Note that, a lower limit value of the thickness of the adhesive layer 3 in the outer edge regions $R_2$ is preferably within the range expressed by the above-described expression (1). Consequently, it is possible to obtain the operations and effects similar to the operations and effects described in the above-described [4].

Third Embodiment

Figure 6:
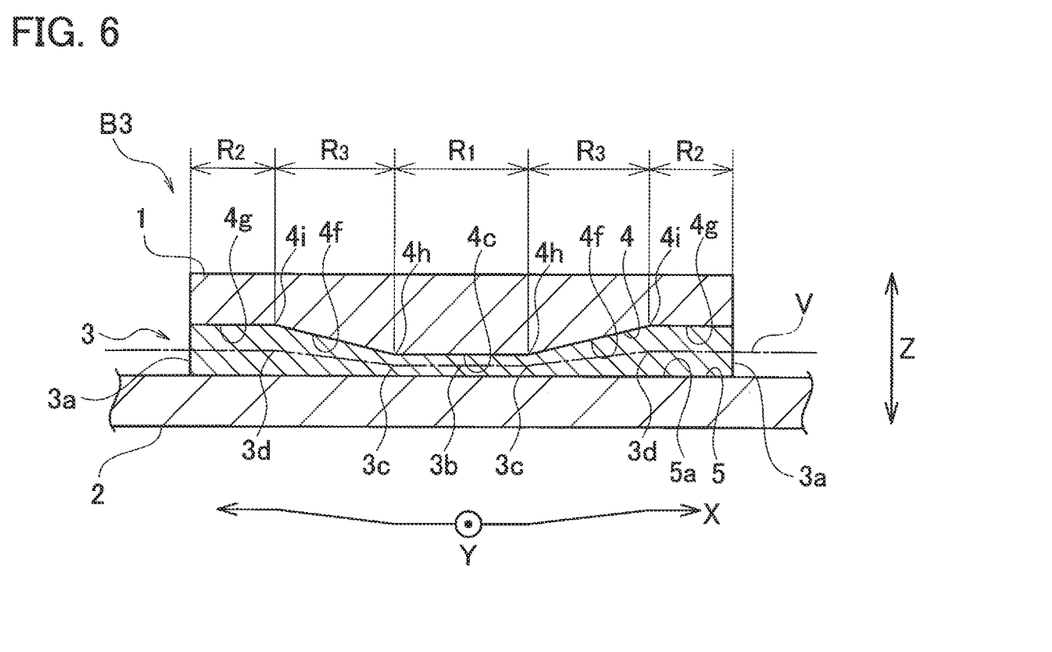
FIG. 6 is a cross-sectional view of a joined structure according to a third embodiment.

In the third embodiment, the adhesive layer 3 includes the center region $R_1$, a pair of middle regions $R_3$, and the pair of outer edge regions $R_2$ as illustrated in FIG. 6. The center region $R_1$ includes the center portion 3b. The pair of middle regions $R_3$ extend outward in the X direction from the boundary portions 3c on the two outer sides in the X direction of the center region $R_1$, respectively. The pair of outer edge regions $R_2$ extend outward in the X direction from the boundary portions 3d on the two outer sides in the X direction of the pair of middle regions $R_3$ and include the end portions 3a, respectively.

A thickness in each of the center region $R_1$ and the pair of outer edge regions $R_2$ of the adhesive layer 3 is constant in the X direction. A thickness in each middle region $R_3$ is the smallest in the boundary portion 3c between the center region $R_1$ and the middle regions $R_3$, is increased toward the outer side in the X direction from the boundary portion 3c, and is the greatest in the boundary portion 3d between the middle regions $R_3$ and the outer edge regions $R_2$. That is, the Z direction dimension of the clearance between the attaching surface 4 and the attaching surface 5 is constant within the area in which the attaching surfaces 4 and 5 are put in contact with each of the center region $R_1$ and the pair of outer edge regions $R_2$. Additionally, the Z direction dimension of the clearance is the smallest in the position in which the attaching surfaces 4 and 5 are put in contact with the boundary portion 3c, is increased toward the outer sides in the X direction from the position of the boundary portion 3c, and is the greatest in the position in which the attaching surfaces 4 and 5 are put in contact with the boundary portions 3d.

The attaching surface 5 may be formed of the single flat surface 5a as illustrated in FIG. 6. The attaching surface 4 may be formed of three flat inclined surfaces 4c and 4g parallel to the attaching surface 5 and two flat inclined surfaces 4f. In this case, each inclined surface 4f is arranged to be inclined with respect to the attaching surface 5, with the inclined surface 4f being farther from the attaching surface 5 as being closer to the outer side in the X direction. The three flat surfaces 4c and 4g are put in contact with the center region $R_1$ and the pair of outer edge regions $R_2$ of the adhesive layer 3, respectively, and the two inclined surfaces 4f are put in contact with the middle regions $R_3$ of the adhesive layer 3, respectively. An intersection line 4h of the flat surface 4c put in contact with the center region $R_1$ and each inclined surface 4f is put in contact with the boundary portion 3c of the adhesive layer 3. An intersection line 4i of the flat surface 4g put in contact with the outer edge region $R_2$ and each inclined surface 4f is put in contact with the boundary portion 3d of the adhesive layer 3.

According to the joined structure B3 of this embodiment, since the thickness of the adhesive layer 3 from the boundary portion 3c to the boundary portion 3d is increased toward the outer sides in the X direction, it is possible to distribute the shear strain in the middle regions $R_3$ more evenly. Additionally, in this embodiment, the attaching surfaces 4 and 5 (flat surfaces 4g and 5a) put in contact with the outer edge regions $R_2$ of the adhesive layer 3 are parallel to each other. Consequently, management of a clearance between the members 1 and 2 in an assembling step (management of the thickness of the adhesive layer 3) is facilitated, and the accuracy of the dimension, the reliability of the adherability, and the like of the joined structure B3 are improved.

Lower limit values of the thicknesses of the adhesive layer 3 in the middle regions $R_3$ and the outer edge regions $R_2$ are preferably within the range expressed by the above-described expression (1). Consequently, it is possible to obtain the operations and effects similar to the operations and effects described in the above-described [4].

Since the second and third embodiments have configurations similar to the configuration of the first embodiment in addition to the above-described configurations, it is possible to obtain the operations and effects similar to the operations and effects described in the above-described [1], [3], and [5]. Additionally, since the method of manufacturing the joined structures B2 and B3 on which the electrodeposition coating has been performed and the operations and effects thereof are similar to the method of manufacturing the joined structure B1 on which the electrodeposition coating has been performed and the operations and effects [6] and [7] thereof, descriptions are omitted.

<Modifications>

Although the thicknesses of the end portions 3a illustrated in FIGS. 1, 5, and 6 are equal to each other on the two sides in the X direction in the first to third embodiments, the thicknesses of the end portions 3a may be different from each other on the two sides in the X direction. Additionally, although the joined structures B1 to B3 illustrated in FIGS. 1, 5, and 6 each have a cross section shaped substantially line-symmetric about an axis or a (not illustrated) straight line perpendicular to the plane direction XY passing through the center portion 3b, the joined structures B1 to B3 may each have the illustrated configuration on only one side of the axis (on only either right side or left side in the diagram). In this case, it is possible to obtain the operations and effects of each of the above-described embodiments on the side having the illustrated configuration. Note that, on the opposite side of the side having the illustrated configuration, the thickness of the adhesive layer 3 may be constant in the X direction.

Moreover, although the center portion 3b of the adhesive layer 3 is set to the position in which the length in the X direction of the adhesive layer 3 is divided in half in the first to third embodiments, the position of the center portion 3b is not limited thereto. The center portion 3b may be displaced in the plane direction XY from the position of dividing in half. For example, when the adhesive layer 3 extends in an asymmetric shape viewed in the Z direction, the center portion 3b may be set in a point in which the shear strain (shear stress affecting the attaching surfaces 4 and 5) due to the difference of amounts of thermal expansion or amounts of thermal contraction between the members 1 and 2 becomes substantially zero.

Furthermore, although the thickness of the adhesive layer 3 is varied (distribution of the thickness is made) in the X direction (longitudinal direction) in the first to third embodiments, the thickness may be varied in a direction other than the X direction such as the Y direction, for example. Additionally, the thickness may be varied in a radial direction toward an outer peripheral end from a center portion in the plane direction of the adhesive layer 3. For example, in a modification of the first embodiment, the thickness of the adhesive layer 3 may be set to be the smallest in the center portion in the plane direction, be increased toward the outer peripheral end from the center portion in the plane direction, and be the greatest in the outer peripheral end. Moreover, in a modification of the second embodiment, the adhesive layer 3 may be sectioned into an outer peripheral region and a plane direction-center region, and a thickness of the adhesive layer 3 in the plane direction-center region may be set to be constant within the region, and a thickness of the adhesive layer 3 in the outer peripheral region may be set to be increased toward the outer peripheral end. Likewise, in a modification of the third embodiment, the adhesive layer 3 may be sectioned into the outer peripheral region, the plane direction-center region, and a circular middle region arranged therebetween, and a thickness of the adhesive layer 3 in the circular middle region may be set to be increased toward the outer peripheral end. In each modification, it is possible to obtain the operations and effects similar to the operations and effects of each of the above-described embodiments in the direction in which the thickness distribution is made in the adhesive layer 3.

Fourth Embodiment

In the joined structure, in a specific position in the plane direction XY of the adhesive layer 3, movement of the attaching surface 5 with respect to the attaching surface 4 (relative displacement) in the plane direction XY may be restricted in some cases. For example, it is the case where a protrusion portion 7 formed on the member 2 is engaged with a concave portion 6 formed on the member 1 as illustrated in FIG. 7, the case where the members 1 and 2 are fixed to each other by a not-illustrated fixture, or the case where the attaching surfaces 4 and 5 have surface shapes that allow a mechanical interference between the attaching surfaces 4 and 5.

In the above-described specific position, the shear strain due to the difference of amounts of thermal expansion or amounts of thermal contraction between the members 1 and 2 becomes substantially zero. In this specification, this specific position is referred to as a reference point P in the plane direction XY. In other words, when relative positions of two intersection points Pa in the plane direction XY, in which interfaces of the adhesive layer 3 with the members 1 and 2 and a straight line L perpendicular to the plane direction XY intersect with each other, are not changed before and after the thermal expansion or the thermal contraction of the members 1 and 2, the position in the plane direction of the intersection points Pa is the reference point P.

Figure 7:
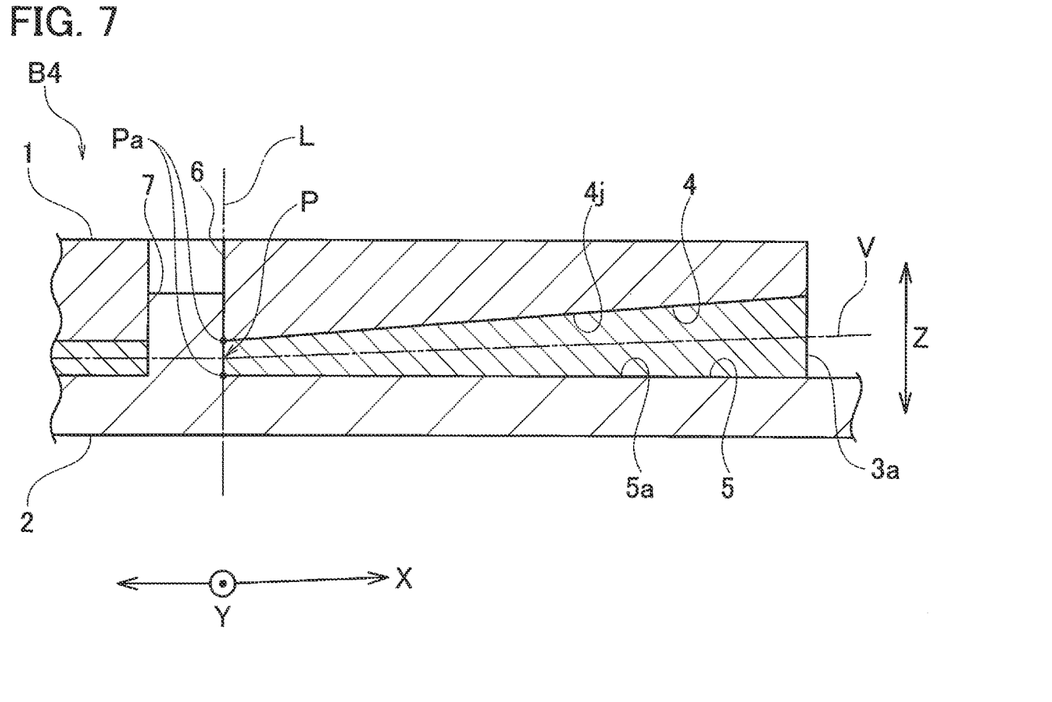
FIG. 7 is a cross-sectional view of a joined structure according to a fourth embodiment.

In the fourth embodiment, as illustrated in FIG. 7, the thickness of the adhesive layer 3 in the end portion 3a farthest from the reference point P in the plane direction XY is greater than the thickness of the adhesive layer 3 in the reference point P. Specifically, in a region on the outer side of the reference point P in the XY direction, the thickness of the adhesive layer 3 is the smallest in the reference point P, is increased toward the outer side in the XY direction from the reference point P, and is the greatest in the end portion 3a. That is, the Z direction dimension of the clearance between the attaching surface 4 and the attaching surface 5 is the smallest in a position in which the attaching surface 4 and the attaching surface 5 are put in contact with the reference point P, is increased toward the outer side in the XY direction from the reference point P, and is the greatest in the position in which the attaching surface 4 and the attaching surface 5 are put in contact with the end portion 3a.

In the region on the outer side of the reference point P in the XY direction, the attaching surface 5 may be formed of the single flat surface 5a, and the attaching surface 4 may be formed of a single flat inclined surface 4j, as illustrated in FIG. 7. In this case, the inclined surface 4j is arranged to be inclined with respect to the attaching surface 5, with the inclined surface 4j being farther from the attaching surface 5 as being closer to the outer side in the X direction.

According to the joined structure B4 of this embodiment, the thickness in the end portion 3a is greater than the thickness in the reference point P of the adhesive layer 3. Consequently, it is possible to improve the adherability of the joined structure B4 with the small thickness of the adhesive layer 3 around the reference point P while suppressing the generation of a crack in the adhesive layer 3 by reducing the shear strain in the end portion 3a.

Additionally, according to the joined structure B4, since the thickness of the adhesive layer 3 is increased toward the outer side in the XY direction from the reference point P, it is possible to distribute the shear strain in regions on the outer side of the reference point P in the XY direction more evenly in the plane direction XY. Specifically, in this embodiment, since the thickness of the adhesive layer 3 is increased at a constant incline (linearly in a cross section) toward the outer side in the XY direction from the reference point P, the shear strain distribution becomes more even.

Moreover, the shear strain of the adhesive layer 3 is likely to be the greatest in the end portion 3a farthest from the reference point P in the plane direction XY. According to the joined structure B4, since the thickness in the end portion 3a farthest from the reference point P in the plane direction XY is greater than the thickness in the reference point P, it is possible to reduce the maximum value of the shear strain more reliably and to suppress the generation of a crack in the adhesive layer 3 more reliably.

Note that, the lower limit value of the thickness of the adhesive layer 3 in the region on the outer side of the reference point P in the XY direction is preferably set to a value satisfying the expression (1) where a distance from the reference point P in the XY direction is substituted as a variable x. Consequently, it is possible to obtain the operations and effects similar to the operations and effects described in the above-described [4].

Furthermore, since the joined structure B4 can exert the excellent adherability and the effect of preventing a crack in the adhesive layer 3 against a change in temperature in the surrounding environment, it is possible to obtain the operations and effects similar to the operations and effects described in the above-described [5].

Like the above-described method of manufacturing the joined structures B1 to B3, the method of manufacturing the joined structure B4 on which the electrodeposition coating has been performed includes the adhesive applying step S1, the temporary fixing step S2, the electrodeposition coating step S3, and the joining step S4.

In the temporary fixing step S2, the member 1 and the member 2 are positioned and temporarily fixed such that the Z direction dimension of the clearance between the attaching surface 4 and the attaching surface 5 is the smallest in the position in which the attaching surfaces 4 and 5 are put in contact with the reference point P and is the greatest in the position in which the attaching surfaces 4 and 5 are put in contact with the end portion 3a.

In the joining step S4, the thickness of the adhesive layer 3 cured by the heating is the smallest in the reference point P, is increased toward the outer side in the XY direction from the reference point P, and is the greatest in the end portion 3a. Note that, since the other steps are similar to that of the above-described joined structures B1 to B3, descriptions are omitted.

According to this method, the thickness of the adhesive layer 3 cured by the heating is set to be greater in the end portion 3a than in the reference point P. Consequently, it is possible to improve the adherability with the small thickness of the adhesive layer 3 around the reference point P while suppressing the generation of a crack in the adhesive layer 3 by reducing the shear strain in the end portion 3a generated in the cooling step after the curing. Additionally, according to this method, since the heat curing type-adhesive Ad is used, the baking of the coating film and the curing of the adhesive Ad can be simultaneously performed by curing once, and consequently, it is possible to manufacture the joined structure B4 on which the electrodeposition coating has been performed with good productivity.

Fifth Embodiment

Figure 8A:
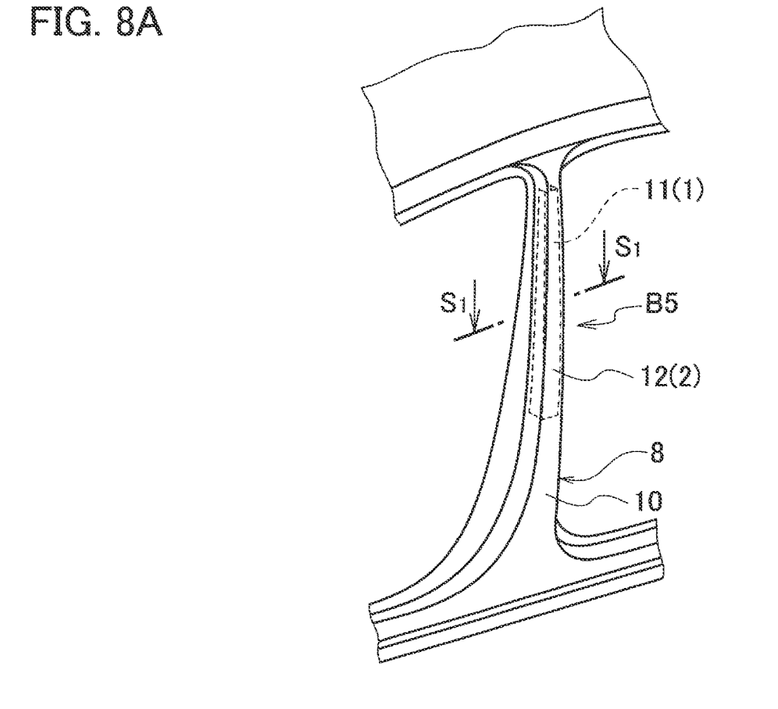
FIG. 8A is a perspective view of a center pillar according to a fifth embodiment.

A center pillar 8 according to the fifth embodiment extends in a vehicle vertical direction in a vehicle front and rear direction-center portion of a body side panel as illustrated in FIG. 8A. The center pillar 8 has a closed hollow cross section-configuration and includes a pillar inner 9 and a pillar outer 10 joined to the pillar inner 9 as illustrated in FIG. 8B.

The pillar outer 10 extends in the vehicle vertical direction on an outer side of the pillar inner 9 in a vehicle width direction and constitutes a vehicle width direction-outer portion of the center pillar 8. The pillar outer 10 is the joined structure B5 of this embodiment and includes an inner panel 11 made of carbon fiber reinforced plastic, an outer panel 12 made of a steel plate, and the adhesive layer 3 arranged between the inner panel 11 and the outer panel 12 to join the inner and outer panels 11 and 12 together.

Figure 8B:
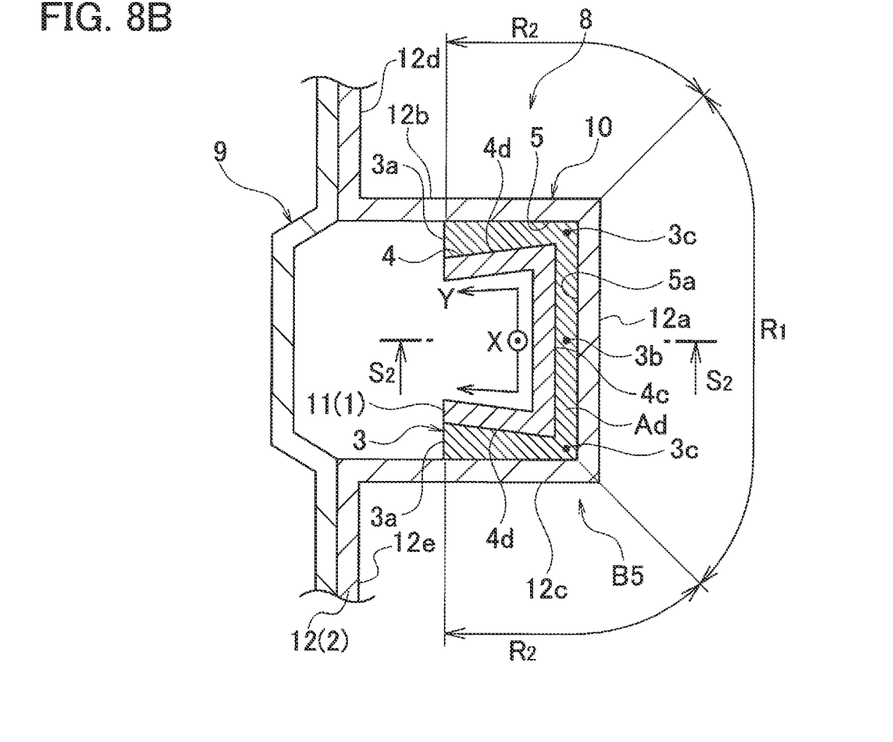
FIG. 8B is a cross-sectional view taken along $S_1$-$S_1$ in FIG. 8A.

The outer panel 12 has a hat-shaped cross section as illustrated in FIG. 8B. Specifically, the outer panel 12 includes a vertical wall portion 12a, a front wall portion 12b and a rear wall portion 12c respectively extending inward in the vehicle width direction from a front end and a rear end of the vertical wall portion 12a, and a front flange 12d and a rear flange 12e respectively extending frontward and rearward from inner ends of the front wall portion 12b and the rear wall portion 12c.

In a transverse cross section, the inner panel 11 extends along the front wall portion 12b, the vertical wall portion 12a, and the rear wall portion 12c of the outer panel 12 and is attached on surfaces on inner sides of closed cross sections of the front, vertical, and rear wall portions 12b, 12a, and 12c with the adhesive Ad. The inner panel 11 extends in the vehicle vertical direction over an area of about ¾ of the total length of the center pillar 8.

The pillar outer 10 has a configuration similar to the configuration illustrated in FIG. 5 in a cross section along a longitudinal direction of the pillar outer 10 or the X direction of the adhesive layer 3 ($S_2$-$S_2$ cross section in FIG. 8B). The member 1 in FIG. 5 corresponds to the inner panel 11, the member 2 in FIG. 5 corresponds to the outer panel 12, and the X direction in FIG. 5 corresponds to the extending direction of the pillar outer 10, respectively. Since specific configurations of an attaching surface of the inner panel 11, an attaching surface of the outer panel 12, and the adhesive layer 3 are similar to that of the attaching surface 4, the attaching surface 5, and the adhesive layer 3 according to the second embodiment, descriptions are omitted.

In a cross section perpendicular to the longitudinal direction of the pillar outer 10, or a cross section perpendicular to the X direction of the adhesive layer 3 (parallel to the Y direction), the adhesive layer 3 includes the center region $R_1$ and the pair of outer edge regions $R_2$ as illustrated in FIG. 8B. The center region $R_1$ is put in contact with the vertical wall portion 12a of the outer panel 12, and the pair of outer edge regions $R_2$ are put in contact with the front wall portion 12b and the rear wall portion 12c, respectively. The center region $R_1$ includes the center portion 3b, and the pair of outer edge regions R extend outward in the Y direction from the boundary portions 3c on two outer sides in the Y direction of the center region $R_1$ and include the end portions 3a, respectively. A thickness in the center region $R_1$ of the adhesive layer 3 is constant in the Y direction. A thickness of the adhesive layer 3 in each outer edge region $R_2$ is the smallest in the boundary portion 3c between the center region $R_1$ and the outer edge region $R_2$, is increased toward the outer side in the Y direction from the boundary portion 3c, and is the greatest in the pair of end portions 3a.

According to the pillar outer 10 as the joined structure B5 of this embodiment, since the configurations of the adhesive layer 3 in both the X direction and the Y direction are similar to that of the second embodiment, it is possible to obtain the operations and effects similar to at least that of the second embodiment.

Note that, it is also possible to apply the configuration of the first, third, or fourth embodiment to the configuration of joining the inner panel 11 and the outer panel 12 together. In this case, the configuration of the cross section along the longitudinal direction of the pillar outer 10 ($S_2$-$S_2$ cross section in FIG. 8B) is similar to the configuration illustrated in FIG. 1, 6, or 7.

Sixth Embodiment

Figure 9:
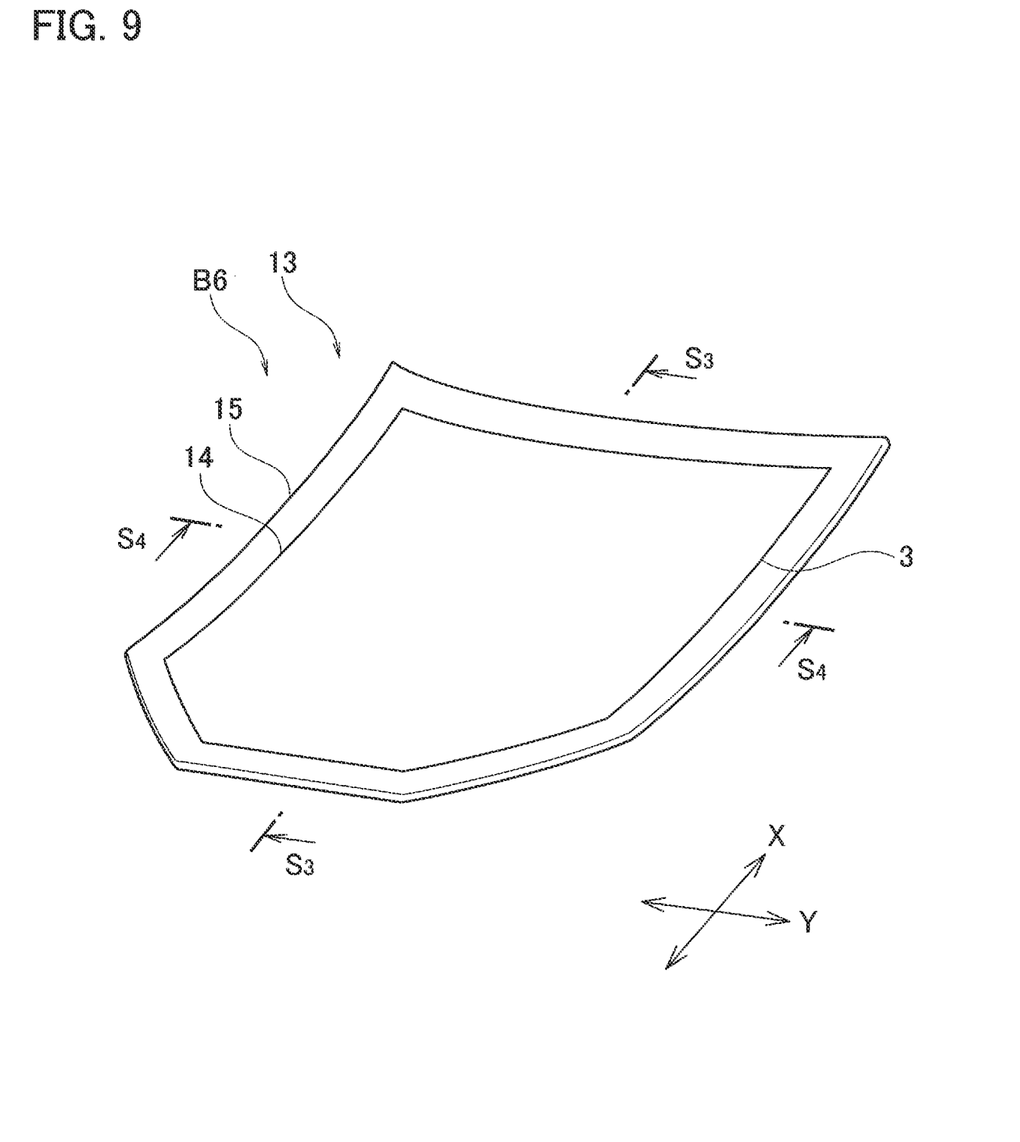
FIG. 9 is a perspective view of a hood according to a sixth embodiment seen from below.

A hood 13 according to the sixth embodiment constitutes a top surface of a vehicle body front portion and covers the top of an engine room. The hood 13 includes a hood outer panel 15 made of a steel plate, a hood inner panel 14 made of carbon fiber reinforced plastic, and the adhesive layer 3 arranged between the hood outer panel 15 and the hood inner panel 14 to join the hood outer and inner panels 15 and 14 together, as illustrated in FIG. 9. The hood inner panel 14 is attached to a bottom surface of the hood outer panel 15 with the adhesive Ad.

The hood 13 is the joined structure B6 of this embodiment and has a configuration similar to the configuration illustrated in FIG. 5 in a cross section along the vehicle front and rear direction ($S_3$-$S_3$ cross section) and a cross section along the vehicle width direction ($S_4$-$S_4$ cross section). The member 1 in FIG. 5 corresponds to the hood inner panel 14, the member 2 in FIG. 5 corresponds to the hood outer panel 15, the X direction in FIG. 5 corresponds to either one of the vehicle front and rear direction and the vehicle width direction, and the Y direction in FIG. 5 corresponds to the other one of the vehicle front and rear direction and the vehicle width direction, respectively. Since specific configurations of an attaching surface of the hood inner panel 14, an attaching surface of the hood outer panel 15, and the adhesive layer are similar to the configurations of the attaching surface 4, the attaching surface 5, and the adhesive layer 3 according to the second embodiment, descriptions are omitted.

According to the hood 13 as the joined structure B6 of this embodiment, since the configurations of the adhesive layer 3 in both the X direction and the Y direction are similar to that of the second embodiment, it is possible to obtain the operations and effects similar to at least that of the second embodiment.

Note that, it is also possible to apply the configuration of the first, third, or fourth embodiment to the configuration of joining the hood inner panel 14 and the hood outer panel 15. In this case, the configuration of the hood 13 in the cross section along the vehicle front and rear direction ($S_3$-$S_3$ cross section) and the cross section along the vehicle width direction ($S_4$-$S_4$ cross section) is similar to the configuration illustrated in FIG. 1, 6, or 7.

Although some embodiments and modifications (hereinafter, embodiments and the like) are described above, these embodiments and the like are merely examples described only for facilitating the understanding of the invention. The technical scope of the invention is not limited to the specific technical items disclosed in the above-described embodiments and the like and includes also various modifications, changes, alternative techniques, and the like that may be easily derived from the technical items.

For example, although the inclined surfaces 4a, 4d, 4f, and 4j are formed on only the side of the attaching surface 4 in the above-described embodiments and the like, the inclined surfaces 4a, 4d, 4f, and 4j may be provided on only the side of the attaching surface 5, or may be provided on both the attaching surfaces 4 and 5. Additionally, although the attaching surfaces 4 and 5 are formed of a combination of the flat surfaces (flat surfaces 4c and 4g and inclined surfaces 4a, 4d, 4f, and 4j), the attaching surfaces 4 and 5 may be formed of bent surfaces, curved surfaces, a combination of those surfaces and the flat surfaces, or the like. Moreover, partial configurations of the attaching surfaces 4 and 5 of the first to fourth embodiments may be combined in the plane direction.

Furthermore, although the adhesive Ad is arranged continuously in the plane direction XY with no clearance in the adhesive layer 3 of the above-described embodiments, the adhesive Ad may be arranged discontinuously in the plane direction XY so as to be in the form of borders (such as form of belts or form of lines), the form of spots, or the like viewed in the Z direction of the adhesive layer 3. Additionally, the adhesive layer 3 in a partial region such as, for example, the center portion 3b, around the center portion 3b, the center region $R_1$, and the middle region $R_3$ may be omitted without falling below the required adherability. Consequently, it is possible to save the amount of using the adhesive Ad.

Moreover, the joined structures B1 to B6 may include a third member joined to either of the members 1 and 2 with the adhesive layer 3 arranged therebetween. The third member may be formed of a material having coefficients of linear expansion different from either of that of the members 1 and 2. In this case, for example, an attaching surface substantially parallel to the adhesive layer 3 may be provided to either of the members 1 and 2, and an adhesive layer similar to the adhesive layer 3 of the above-described embodiments and the like may be provided between the attaching surface and an attaching surface of the third member. Consequently, it is possible to obtain the operations and effects similar to that of the above-described embodiments also in the joint portion of the third member.

INDUSTRIAL APPLICABILITY

The joined structure according to the present invention can be utilized as a constituent member of a vehicle such as an automobile that is, for example, a hood, a floor panel, a door panel, a bumper, a trunk lid, a rear gate, a fender panel, a side body panel, a roof panel, and so on. Additionally, the joined structure according to the present invention can be utilized as a constituent member of a transport vehicle such as an air plane, a ship, and a train vehicle, a household electronic, a power generation facility, a production machinery, housing equipment, furniture, a leisure product, and the like.

REFERENCE SIGNS LIST

B1 to B6 joined structure
1, 2 first member, second member (two members)
3 adhesive layer
3a end portion
3b center portion
3c boundary portion
3d boundary portion
$R_1$ center region
$R_2$ outer edge region
$R_3$ middle region
P reference point
L straight line
Pa intersection point

The invention claimed is:

1. A joined structure, comprising:
a first member made of a fiber reinforced plastic and a second member made of a metal having a coefficient of linear expansion different from that of the fiber reinforced plastic, the first and second members including elongated joint surfaces, respectively, the elongated joint surfaces extending along a longitudinal direction along which the first and second members are joined to each other by an adhesive and
an adhesive layer of the adhesive, arranged between the elongated joint surfaces and extending along the longitudinal direction of a virtual plane that is equidistant from the two attaching elongated joint surfaces to join the elongated joint surfaces together,
wherein
the elongated joint surface of the first member is shaped such that the adhesive layer includes end portions in the longitudinal direction and a center portion in the longitudinal direction between the end portions, and
thicknesses in the end portions are greater than a thickness in the center portion,
wherein
the adhesive layer includes a pair of outer edge regions in a transverse direction of the virtual plane which is perpendicular to the longitudinal direction, and
the longitudinal direction is a direction along which the adhesive layer has longer dimension than the adhesive layer has along the transverse direction.

2. The joined structure according to claim 1, wherein the thickness of the adhesive layer is increased toward an outer side in the longitudinal direction from the center portion.

3. The joined structure according to claim 1, wherein the adhesive layer includes
a center region including the center portion, and
a pair of outer edge regions respectively extending toward outer sides in the longitudinal direction from boundary portions on two outer sides in the longitudinal direction of the center region and each including the end portion, and
a thickness in the center region is constant in the longitudinal direction, and
thicknesses in the pair of outer edge regions are respectively increased toward the outer sides in the longitudinal direction from the boundary portions between the center region and the outer edge regions.

4. The joined structure according to claim 1, wherein the adhesive layer includes
a center region including the center portion,
a pair of middle regions respectively extending toward outer sides in the longitudinal direction from boundary portions on two outer sides in the longitudinal direction of the center region, and
a pair of outer edge regions respectively extending toward the outer sides in the longitudinal direction from boundary portions on two outer sides in the longitudinal direction of the pair of middle regions and each including the end portion, and
a thickness in the center region is constant in the longitudinal direction,
a thickness in each of the pair of outer edge regions is constant in the longitudinal direction, and
thicknesses in the pair of middle regions are respectively increased toward the outer sides in the longitudinal direction from the boundary portions between the center region and the middle regions.

5. The joined structure according to claim 1, wherein electrodeposition coating has been performed on the joined structure.

6. A vehicle frame member, comprising:
a first elongated member made of a fiber reinforced plastic and a second elongated member made of a metal having a coefficient of linear expansion different from that of the fiber reinforced plastic, the first and second elongated members including elongated joint surfaces, respectively, the elongated joint surfaces each extending along a longitudinal direction; and
an adhesive layer arranged between the two elongated members and extending along the longitudinal direction of a virtual plane that is equidistant from the two attaching elongated joint surfaces to join the two elongated members together,
wherein the elongated joint surface of the first member is shaped such that the adhesive layer includes end portions in the longitudinal direction and a center portion in the longitudinal direction between the end portions, and thicknesses in the end portions are greater than a thickness in the center portion,
wherein the adhesive layer includes a pair of outer edge regions in a transverse direction of the virtual plane which is perpendicular to the longitudinal direction, and the longitudinal direction is a direction along which the adhesive layer has longer dimension than the adhesive layer has along the transverse direction.

7. The vehicle frame member according to claim 6, wherein the vehicle frame member comprises a pillar,
one of the two elongated members comprises an outer panel constituting an exterior surface of the pillar, and
the other of the two elongated members comprises an inner panel attached on an inner surface of the outer panel.

8. A method of manufacturing a joined structure, comprising:
temporarily fixing a first member made of a fiber reinforced plastic and a second member made of a metal having a coefficient of linear expansion different from that of the fiber reinforced plastic, by putting the first and second members together with an uncured adhesive layer arranged therebetween;
performing electrodeposition coating on the temporarily fixed first and second members; and
joining the first and second members together by curing the adhesive layer while heating the first and second members on which the electrodeposition coating has been performed and baking a coating film formed by the electrodeposition coating on the two members,
wherein
the first and second members include elongated joint surfaces, respectively,
the elongated joint surfaces extending along a longitudinal direction along which the first and second members are joined to each other by the adhesive layer,
the adhesive layer cured by the heating is arranged between the elongated joint surfaces and extends along the longitudinal direction of a virtual plane that is equidistant from the two attaching elongated joint surfaces to join the elongated joint surfaces together,
the elongated joint surface of the first member is shaped such that the adhesive layer includes end portions in the longitudinal direction and a center portion in the longitudinal direction between the end portions, a thickness of the adhesive layer is greater in an end portion in the longitudinal direction than in the center portion in the longitudinal direction,
the adhesive layer includes a pair of outer edge regions in a transverse direction of the virtual plane which is perpendicular to the longitudinal direction, and
the longitudinal direction is a direction along which the adhesive layer has longer dimension than the adhesive layer has along the transverse direction.

* * * * *